United States Patent [19]

Lapp

[11] Patent Number: 4,654,821
[45] Date of Patent: Mar. 31, 1987

[54] AUTOMATIC RESTART APPARATUS FOR A PROCESSING SYSTEM

[75] Inventor: Theodore R. Lapp, Mission Viejo, Calif.

[73] Assignee: Q-COM, Inc., Santa Ana, Calif.

[21] Appl. No.: 654,997

[22] Filed: Sep. 26, 1984

[51] Int. Cl.⁴ ............................................. G06F 11/00
[52] U.S. Cl. ...................................... 364/900; 371/12
[58] Field of Search ... 364/200 MS File, 900 MS File; 371/12, 16

[56] References Cited

U.S. PATENT DOCUMENTS

| | | | |
|---|---|---|---|
| 3,828,321 | 8/1974 | Wilber et al. | 364/200 |
| 4,172,281 | 10/1979 | Gordon | 364/200 |
| 4,377,000 | 3/1983 | Staab | 371/11 |
| 4,535,404 | 8/1985 | Shenk | 364/200 |
| 4,538,273 | 8/1985 | Lasser | 371/62 |

*Primary Examiner*—Eddie P. Chan
*Attorney, Agent, or Firm*—Fitch, Even, Tabin & Flannery

[57] ABSTRACT

An automatic loading apparatus for a processing system for restarting an application program upon sensing a software failure. The application program periodically executes at least one portion of a reset code which addresses a peripheral device controller. The peripheral device controller times the frequency of the access by the processing system to determine whether the application program is executing successfully. If the application program does not access the peripheral control device within the normal period of execution for the reset code then this is an indication of a failure of the software to execute in the right sequence or a halt to the processing of the application program. Upon a failure indication, the peripheral control device disconnects power to the processing system and then reconnects power to enable an auto-boot to reload the application program and restart the software execution.

6 Claims, 8 Drawing Figures

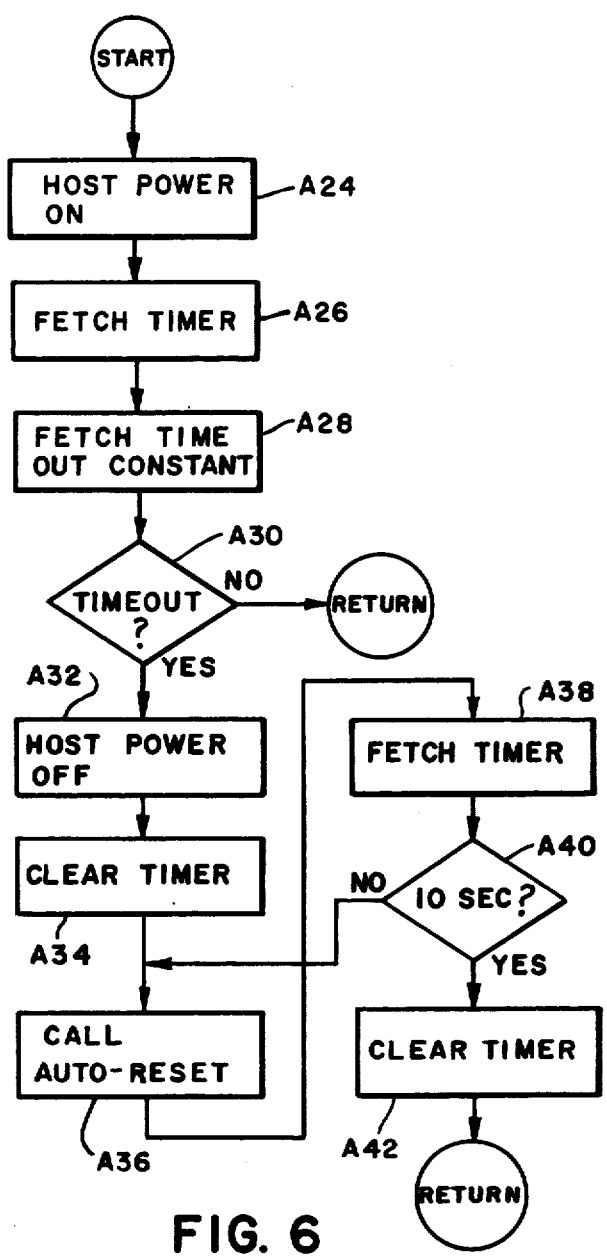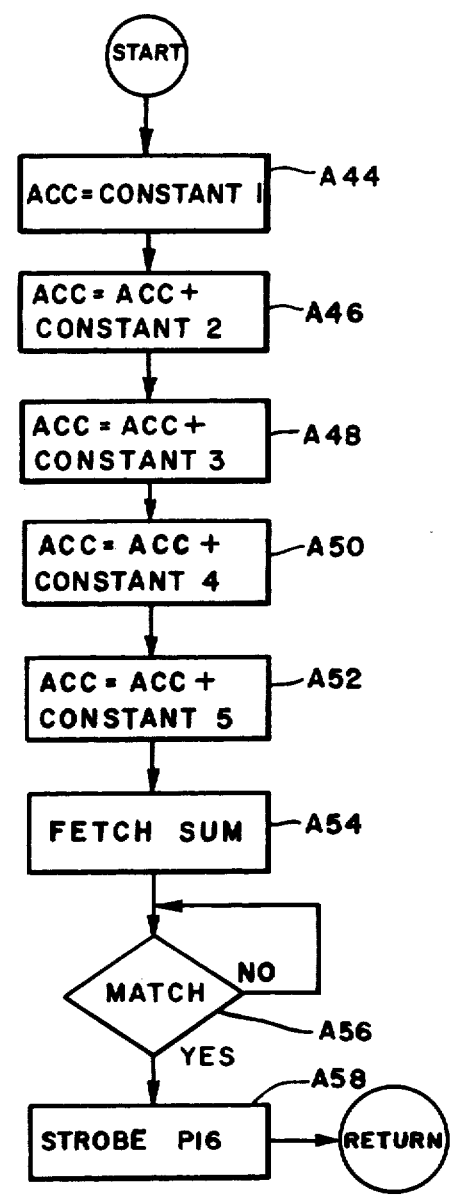
FIG. 6
FIG. 7
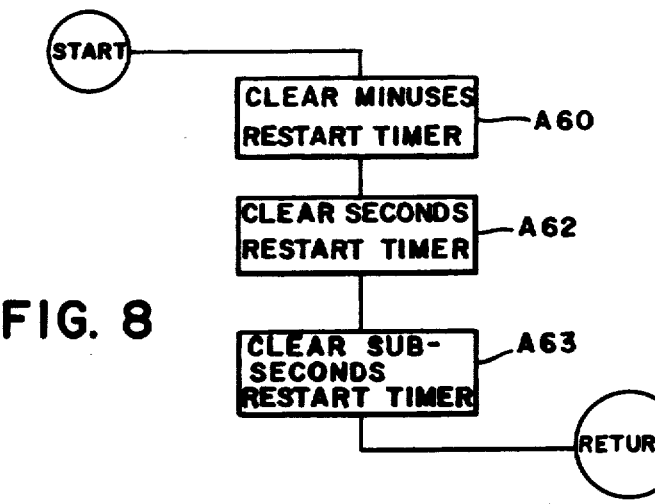
FIG. 8

AUTOMATIC RESTART APPARATUS FOR A PROCESSING SYSTEM

The invention relates generally to an automatic restart apparatus for a processing system and is more particularly directed to a means to perform a power down and power up sequence when a software fault is detected. The power down and power up sequence activates an auto-boot in the processing system which reloads an application program from a nonvolatile source into random access memory.

In information processing and control applications it is many times necessary to have an application program run continuously while unattended for prolonged periods. These programs generally repeat a certain section of program code continuously which can be a control law or some other type of application program for performing a repetitive task. This type of application program is usually found in apparatus which in real time control a number of actuators and monitor a number of sensors. These processing systems are left unattended while the program controls the system hardware to monitor certain parameters and control certain variables automatically.

For example, an environmental control for a structure, such as a greenhouse, may provide ambient temperature control while being left unattended for considerable periods of time. The only time when the control system must be attended is when it stops functioning or to change the operational sequence of the program. These systems remotely control their actuator elements at some distance from the central control unit. It has been conventional in these systems to communicate such control information over the power lines of the installation. This has, however, produced problems including transient voltage and other high level power signals in proximity to the electronics of the central controller. Additionally, in these systems inductive loads such as heavy duty motors are connected to the same power supply as the central processing unit. When such devices switch on and off they inherently cause voltage transients on the power line and thus on the power supply of the central processing unit.

These transients, from power line and other causes, can cause a volatile memory such as a random access memory to lose data or even change data. If this occurs while the system is running the application program of the processing system may experience a software fault or "crash" which causes the program to stop executing the normal sequence of the instructions. This will cause the software to misexecute or halt altogether which can be extremely detrimental in a control environment. If the program is misexecuting there is the other possibility that a control signal may be output which is not correct for the circumstances thereby producing an unwanted result.

In either of these cases, the operation of the control software must be brought back to its normal execution sequence. The normal manner in which this is accomplished, when the random access memory of a system has been altered, is to halt the processing system and cause a reloading of the program. The processing system is then set to begin execution from the initialization section of that software. Those control systems which are left unattended, however, will remain inactive until someone notices the environment is not being controlled sufficiently. For commercial operations over weekends or planned work stopages this could mean the control might be inactive for several days.

Some in the prior art have attempted to solve this problem by providing systems in which the control program is embodied in a nonvolatile memory such as a ROM, EROM, or EEROM, etc. Even with ROM or EEROM program store, transients commonly cause program counter changes, resulting in the same effect. While solving the problem of misexecution because of data changes in the instructions, these nonvolatile memories decrease the flexibility of the control system. When a software update needs to be made or the system just expanded, each memory must be replaced with a new integrated circuit chip containing the changes. Normally, this requires a technician to physically carry the replacement program to wherever the system is located and to remove and replace the previous program chip. For software changes to a program that can be loaded into a random access memory, the system updates are handled in a much more facile manner. These updates are made by exchanging program disks usually a 5¼" floppy disk or the like. These new programs or changes in an existing program can be communicated over the telephone lines, mailed, or obtained at the convenience of the user. A technician is not needed to install a special part nor is an expensive service call required.

Many small processing systems or personal computers include what is termed an auto-boot. This combination of hardware and software is generally used during a power up condition to cause an initial transfer of some programming from a nonvolatile memory such as a disk drive into random access memory. The auto-boot has a short hardware loading routine associated with it to which system control is transferred when a power up condition occurs. The loading routine begins to down load a part of the operating system from the system program disk and then transfers control to it. This section is generally a larger linking loader and finishes loading the operating system from the disk. The entire operation is transparent to the operator where upon a power up condition it appears that the system program is automatically loaded into random access memory and control is transferred thereto. For many application programs, the problem is somewhat different because the software is generally running without supervision and there is no operator to switch the system off and then on to cause the auto-boot to reload the program.

One system having an advantageous use for a restart apparatus is the environmental control system illustrated in U.S. patent application Ser. No. 655,081. In this system, particularly adapted for a greenhouse, the user configures the control according to his preference as to which equipment is used during different stages. The configuration data and thus the control law is stored during an input sequence into random access memory. If for some reason a transient on the power line causes the memory to lose data, portions or all of the control program may be destroyed. If this occurs during an unattended period, it may detrimentally affect the growing cycle of the plants within the greenhouse.

However, the flexibility to configure or reconfigure the environmental control system is such that one does not want to lose it by providing a program on a nonvolatile source initially. Even if one did use a nonvolatile source initially, a fatal crash can easily occur. A more advantageous method is to permit the owner of the system to configure or reconfigure the system on site and thereafter copy it to a nonvolatile source such as floppy disk or tape and then use the system's auto-boot capability to reload and restart the program if necessary. It is, however, important to automate the loading such that the control system may run unattended for considerable periods of time.

SUMMARY OF THE INVENTION

Accordingly, the invention provides an automatic loading apparatus for a processing system which senses a software fault in an executing application program and in response to the fault reloads and restarts the application program.

The automatic loading apparatus operates in combination with a processing system having an auto-boot which loads the random access memory of the system with an application program from a nonvolatile memory device upon power up. The automatic loading apparatus includes means for generating an operational signal whenever the processing system periodically executes a particular set of instructions in the application program; means, responsive to the operational signal, for switching power off to the processing system and then switching it back on whenever the operational signal is not generated within its normal periods, and means for maintaining power on to the processing system when the operational signal is generated within its normal time period.

The automatic loading apparatus utilizes the operational signal to detect the health of the application software. When the periodicity of at least one loop of operating code of the application program is known, the operational signal must be generated within that time period if the program is executing normally. The absence of the operation signal within its defined period indicates that the system has halted or is misexecuting such as in an infinite loop. When a software fault has been detected in this manner the power to the system is switched off and then on again to activate the reloading and reinitialization of the application program by the auto-boot.

The automatic loading apparatus can thus sense transient conditions which are caused by overvoltages and switching spikes on the power supply which are not enough to activate the auto-boot by themselves. For power outages, where the system power goes off for a significant time, the auto-boot will reload and reinitialize the application program. Moreover, an application program which is adapted to be used in a random access memory is compatible with todays smaller general purposes processors, the personal computer or PC. These general purpose machines are being used to run control programs as only one part of their application program set. Because these general purpose machines have such multitask capabilities it is undesirable to limit their flexibility by being dedicated to a control program stored in a RAM. If the problem of being able to detect and cure software faults in a noisy environment can be solved it is believed that more control applications will be found for these extremely flexible machines.

In the preferred embodiment, the switching means is a microprocessor based controller which regulates a switching device disposed in the power supply line of the processor system. The microprocessor controller is a memory mapped I/O device selectable by addressing a particular location in the memory space of the host processor system.

The operational signal is preferably generated by a memory address instruction accessing the microprocessor controller. This is advantageous in that only a memory address has to be generated to provide the operational signal and an indication of the application program health. In most processor systems this can be accomplished within a single processor cycle and by single instruction. Such an instruction can be located anywhere in an application program and executed at anytime since it does not change memory, or I/O by its execution. The only requirement is that the operational signal generating instruction be located in a program loop that is periodically executed.

The microprocessor controller may further provide for the execution of other peripheral tasks for the processor system unrelated to the reloading function. Thus the reloading apparatus can be provided as one of a specialized plurality of tasks performed by an intelligent controller. These other tasks can either be related or unrelated to the task of software execution monitoring.

To maintain the execution sequence in the microprocessor during transients, a hardware reset means is connected between the reset terminal of the microprocessor and an output port of the device. The microprocessor periodically strobes the port and triggers a monostable device with a time constant in excess of the strobe period. As long as the strobes are generated periodically the monostable remains in a triggered state. If for some reason the microprocessor misexecutes its program, then the strobes will cease and the monostable device will make a transition back to its stable state generating a reset signal to reinitiate execution of the microprocessor program.

These and other objects, features, and advantages of the invention will become more apparent and clearly understood from a reading of the following description with reference to the accompanying drawings in which:

BRIEF DESCRIPTION OF THE DRAWINGS

FIG. 6 is a detailed flow chart of the subroutine HOSTAC called from the main program illustrated in FIG. 5;

FIG. 7 is a detailed flow chart of the subroutine AUT called from the main program illustrated in FIG. 5;

FIG. 8 is a detailed flow chart of the subroutine TIMCLR called from the main program illustrated in FIG. 5; and A detailed listing of the subroutines forming the control program which is illustrated in the system flow chart of FIG. 5 is found at appendix A.

DETAILED DESCRIPTION OF THE PREFERRED EMBODIMENT

Figure 1:
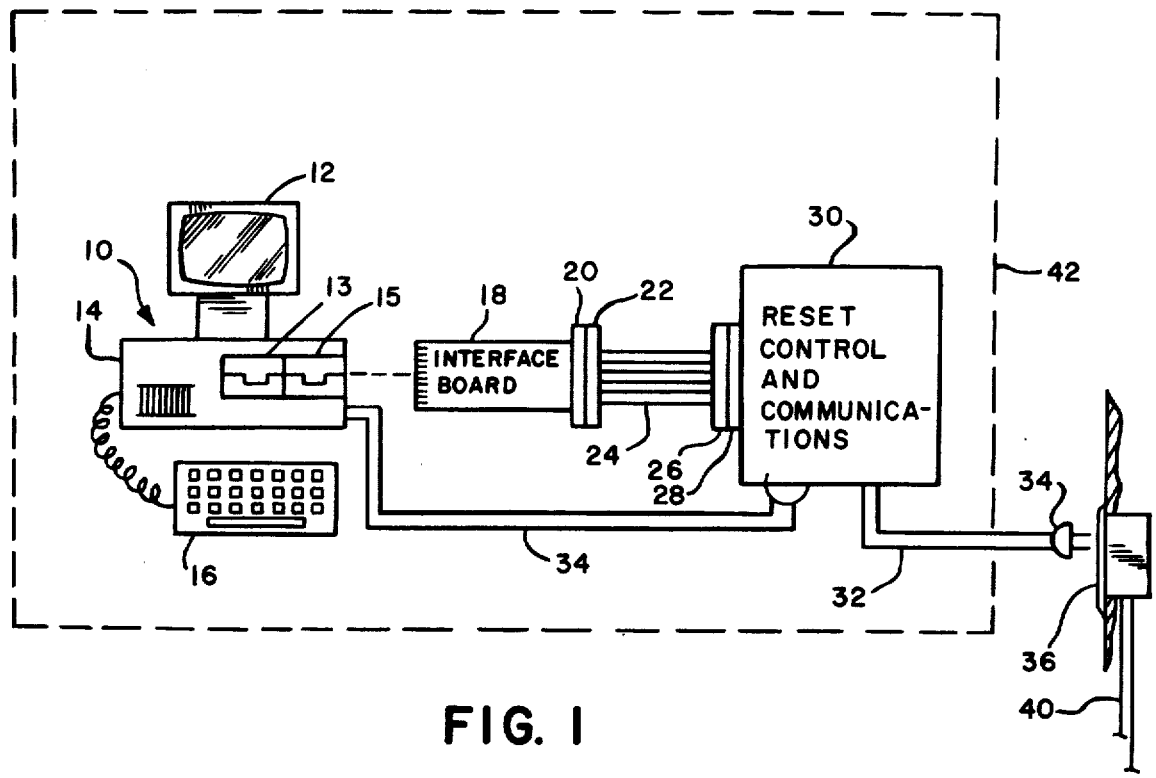
FIG. 1 is a system block diagram of an automatic restart apparatus for a processing system which is constructed in accordance with the invention.

For ease of description like elements in the different FIGURES will be referenced by similar reference numerals. Also, for signals which have a low logical level as their true state, an * will precede the signal name to designate the condition.

With reference now to FIG. 1 there is shown an automatic restart apparatus for processor system constructed in accordance with the invention. The processor system that will be used for illustrating the invention is a personal computer 10. These systems are small, relatively portable, and being used for various control applications. The personal computer system generally comprises a processor 14 having a number of peripheral devices for communication and input/output data handling. The processor 14 can be a personal computer having two disk drives 13 and 15 which support a standard disk operating system. One disk drive, for example, 13 can be used to load the operating system and the other disk drive 15 can be used to load a number of application programs. Operator interface with the processor 14 is provided by a keyboard 16 under control of the person commanding the system. Further included in the personal computer 10 is a CRT or video monitor 12 which provides text and graphics display for the operator.

In the preferred implementation of the invention the personal computer would be an Apple IIe having a 128k of random access memory divided into 64k of main memory and 64k of auxiliary memory. The operating system used with the Apple IIe, for example, could be Apple DOS version 3.3. Further, the system of the personal computer 10 includes an auto-boot such that when the power to the processor is turned on an automatic loading of either the system program or any of the application programs occurs.

It is well known that the Apple IIe personal computer and many other personal computers have expansion slots into which a printed circuit board can be inserted to provide additional peripheral functions. The invention provides an interface board 18 or expansion card which plugs into one of the standard expansion slots on the Apple IIe and thereafter is coupled to a connector 20 which outputs signals to other devices not within the normal personal computer peripheral set. The personal computer 10 through the interface board 18 can communicate with a peripheral such as a reset control and communications circuit 30. To communicate with the reset control and communications circuit 30, the personal computer 10 is provided with a ribbon connector 24. The ribbon connector 24 is terminated on one end by a cable connector 22 and on its other end by a cable connector 26. The cable connector 22 interfaces with the outboard connector 22 of the interface board 18 while the cable connector 26 interfaces with the inboard connector 28 of the reset control and communications circuit 30. The interface board 18 and the ribbon connector 24 provide a convenient means for the personal computer system 10 to bidirectionally communicate with the reset control and communications circuit 30.

Power for the reset control and communications circuit 30 and for the personal computer 10 is provided by a power cord 32 terminated with a plug 34 which can be inserted in a socket 36. The socket 36 is conventionally powered from an AC power line 40 and provides normal 60 cycle AC power to the particular power supplies of the devices 10 and 30. The power cord 34 for the personal computer 10 is plugged into a socket on the reset control and communications circuit 30 and receives power therefrom.

The reset control and communications circuit 30 has at least two independent functions and could be provided with more. Preferably, the circuit 30 is an intelligent controller which can be programmed for many peripheral tasks for the personal computer 10.

Initially, the reset control and communications circuit 30 is a communication device which receives data and commands via the interface board 18 and ribbon connector 24 and which through a transmitter/receiver communicates that information over the power line 40 via the power cord 32. A number of peripheral devices may be attached to the power line 40 and be controlled in this manner. Alternatively, data communications from those peripheral devices can be passed from the reset control and communications circuit 30 via the ribbon connector 24 and interface board 18 to the personal computer system 10.

According to the invention, a second function that the reset control and communications circuit 30 provides is a restart function for the host personal computer 10. An operational signal is generated by the personal computer 10 and transferred via the interface board 18 and ribbon connector 24 to the reset control and communications circuit 30. This operational signal is generated periodically by executing a command which accesses the interface board 18 at least once every operational loop of the application program in the personal computer. Because of the periodicity of the loop of the operating code of the application program, the operational signal will be generated within a certain time period. The absence of the operational signal within that defined period indicates that the personal computer system has halted or is misexecuting the application program, as in an infinite loop. When such a software fault is detected in this manner, the power to the power cord 34 is switched off and then on again by the circuit 30 to activate the reloading and reinitialization of the application program by the auto-boot of the personal computer 10.

Figure 2:
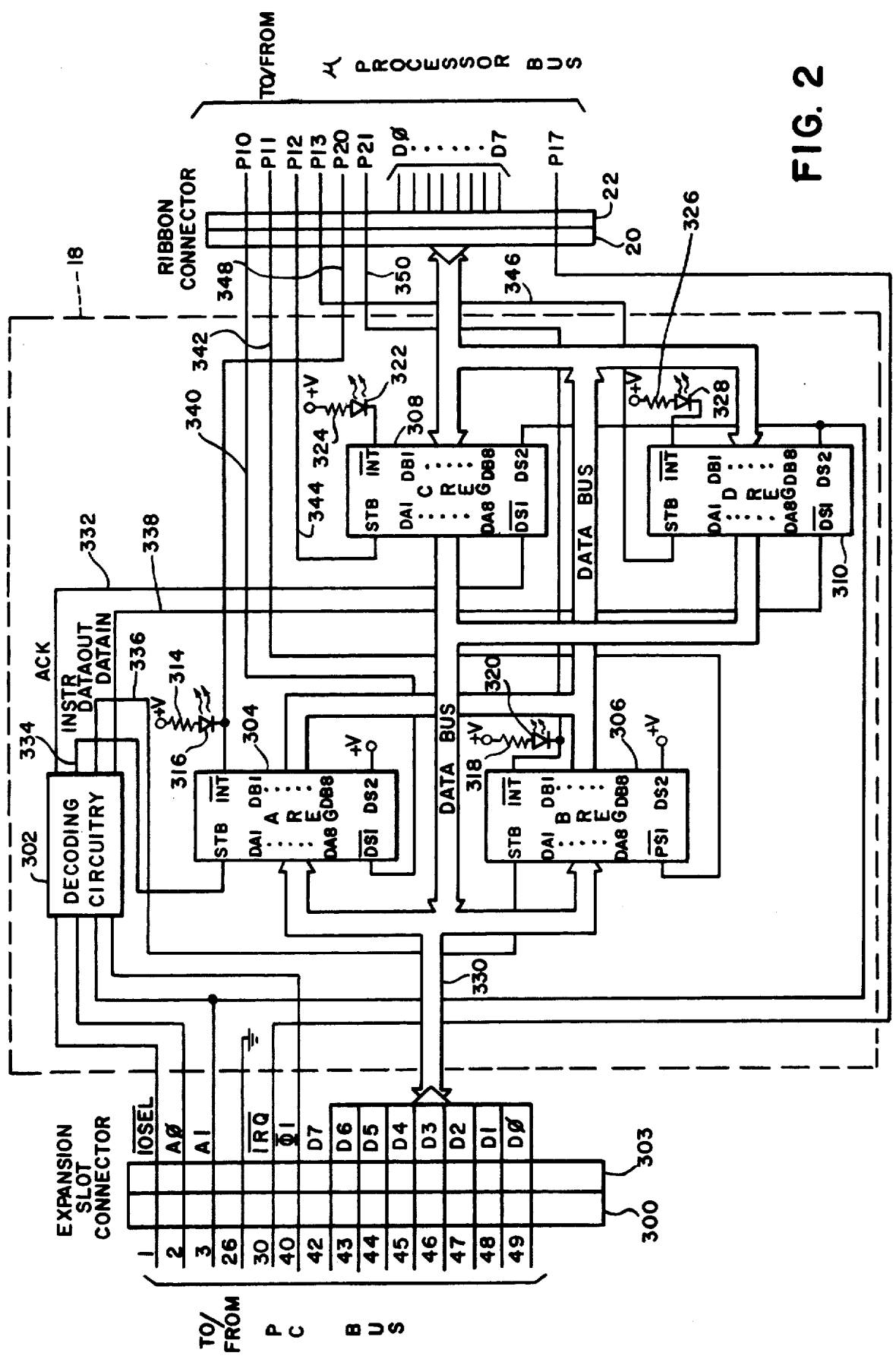
FIG. 2 is a detailed electrical schematic diagram of an interface circuit which inserts into an expansion slot of the personal computer illustrated in FIG. 1.

With respect now to FIG. 2, there is shown the detailed circuitry comprising the expansion card 18 for the personal computer 10. An expansion slot connector 300 connects to the personal computer bus in order to transfer data and control signals which are used by the circuit 30 to provide the data exchange and transmission to remotely controlled elements. The pin numbers on the left side of the expansion slot connector 300 correspond to those normally found in expansion slot connectors of the Apple IIe personal computer. The signal references correspond to those bus signals which are normally connected to the expansion slots of an Apple IIe personal computer. The connector 300 is coupled directly to a connector 303 on the interface board 18 to provide for signal transfer between the devices.

The control signal *IOSEL in combination with the address lines A0, A1 provide an addressing scheme to memory map the interface board 18 and the circuit 30 into the memory space of the personal computer 10. The signal *IOSEL and address lines A0, A1 are decoded by address decoding circuitry 302 to become an acknowledge signal ACK on signal line 332, and instruction signal INSTR on signal line 334, an output data signal DATAOUT on signal line 336, and an input data signal DATAIN on signal line 338. These signals allow the personal computer 10 to write to and read from four eight-bit bidirectional registers 304, 306, 308 and 310, respectively, labeled the A register, B register, C register and D register.

The A register and B register have data inputs DA1-DA8 connected to the data bus 330 of the personal computer. Data in these registers can be output to the circuit 30 via the outputs DB1-DB8 of the registers. The outputs DB1-DB8 are coupled through connector 20 of the expansion cord 18 to the connector 22 of the ribbon connector 24. The data is communicated via the common data bus 330 to the data bus D0-D7 of circuit 30 via the ribbon connector 24. Alternatively, the personal computer 10 reads data from the C register and D register via the data bus 330 and their output lines DA1-DA8 connected thereto. Data is written into the C register and D register by circuit 30 via the data bus D0-D7, the data bus 330, and their input terminals DB1-DB8.

The personal computer 10 writes an instruction for circuit 30 into the A register 304 by first addressing the particular memory location in its memory space which defines that register and then by writing data on the data bus 330 during a memory cycle. The address selection is a combination of the phase zero clock signal $\phi 0$, signal *IOSEL, and address lines A0, A1 which decode into the instruction signal INSTR on line 334. This signal is connected to the STB input of the register 304 and produces a strobe of that input. The strobe signal, which occurs during the memory output cycle, loads the data on the data bus 330 into the A register 304. Similarly, data can be written by the personal computer 10 into the B register 306. During another memory write cycle, the B register is selected by the phase zero clock $\phi 0$, address lines A0, A1, and the *IOSEL signal. This signal is decoded by the address decoding circuitry 302 into the signal DATAOUT on line 336 which is input to the STB terminal of the B register. The signal DATAOUT strobes the information that the personal computer 10 has placed on the data bus 330 into the B register.

Data from the circuit 30 which is written into the C register and D register 308 and 310, respectively, is read by the personal computer 10 via the data bus 330 by addressing these two locations in its memory space in combination with the generation of an acknowledge signal ACK and a data in signal DATAIN. To read data from the C register the personal computer 10 addresses the memory location by generating the acknowledge signal ACK on line 332 to produce a low logic level on the *DS1 input of the C register. During this time the input DS2 of register 308 decodes the address line A1 which is at a high level. This combination of signals produces an output of the information stored in the register 308 onto the data bus 330 via its output lines DA1-DA8. In a similar manner, data can be read from the D register 310 by the personal computer 10 by addressing that memory location. The decoding circuitry generates the data in signal DATAIN which is applied to the *DS1 input of the D register 310. The address line A1 is decoded by the input DS2 and, in combination with the signal DATAIN, causes the register 310 to load its contents onto the data bus 330 so that the information can be input to the personal computer 10.

Figure 4:
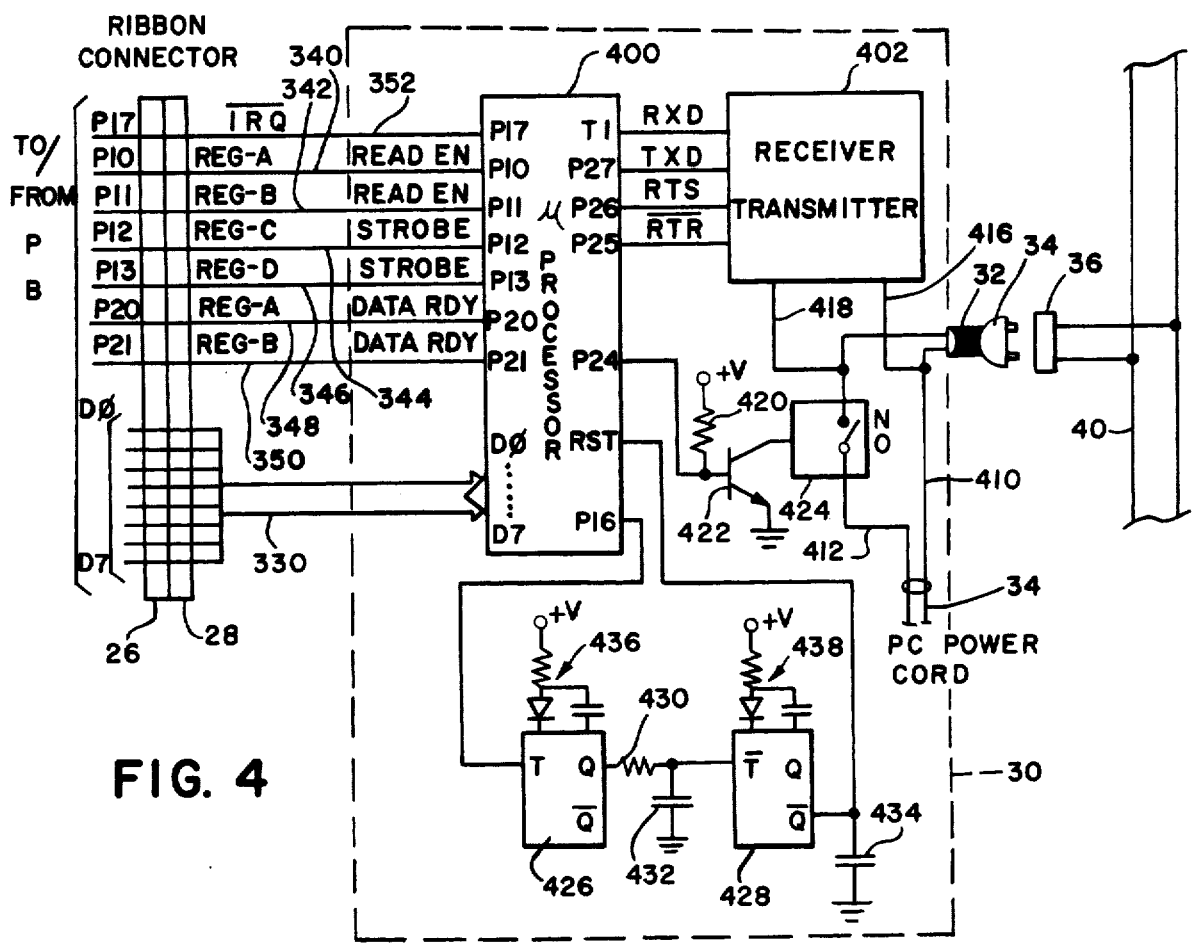
FIG. 4 is a detailed electrical schematic diagram of the reset control and communications circuit illustrated in FIG. 1.

The A register, B register, C register and D register are also read from and written to by the circuit 30 by control outputs from a microprocessor 400 (shown in FIG. 4). When data is ready to be read from the A register, the *INT output of the register produces a low level logic signal via line 348 to the input port P20 of the microprocessor 400. The microprocessor 400 decodes this low level signal as a register A data ready indication, and provides an output via its port 1 pin P10 over line 340 to the *DS1 input of the register. This signal, which is an A register read enable, causes the A register to output the information stored therein onto the data bus 330 which can then be transferred via the ribbon connector 24 to the microprocessor 400.

In a similar manner when the B register has information contained therein, it will produce a low logic level signal on line 350 which is input to the microprocessor 400 via pin P21. This signal is recognized by the microprocessor 400 as a B register data ready signal. The microprocessor responds to this signal by producing a low level logic signal on the *DS1 input of register 306 via line 342. This signal is the B register read enable which causes the register to output its stored data onto the data bus 330. When the data is placed on the data bus 330 and communicated through the ribbon connector, it can be read by inputting the information through the D0-D7 terminals of the microprocessor 400.

Data is written to the C and D registers 308, 310 from the microprocessor 400 by outputting data onto the data bus 330 and strobing the desired register to receive the data. The C register strobe is communicated over line 344 from the output terminal P12 of the microprocessor 400 and connects to the STB input of the register 308. Similarly, the D register strobe is output via line 346 from pin P13 of the microprocessor 400 and is received at the STB input of the D register 310.

In this manner, facile communications between the microprocessor 400 of circuit 30 and the personal computer 10 is maintained. The interface board 18 appears to be four memory locations in the memory space of the personal computer 10 which can either be read from or written to depending upon the operation desired. The microprocessor 400 views the interface board 18 as four I/O devices which can be written to or read from in byte form depending upon its operational circumstance. The microprocessor 400 recognizes the I/O devices as providing an interrupt signal when information is ready and service is needed.

Figure 3:
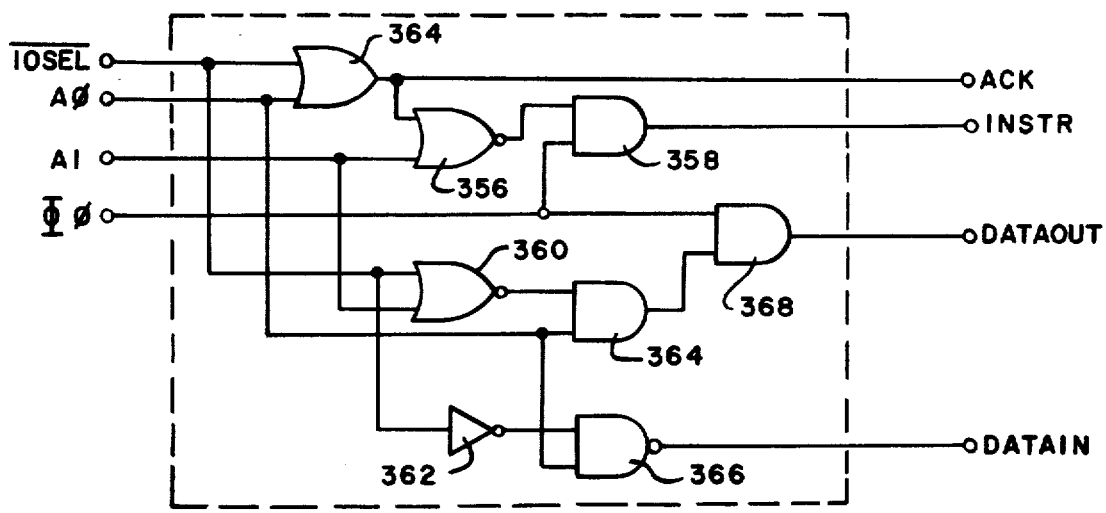
FIG. 3 is a detailed electrical schematic diagram of the decoding circuit of the interface of the circuit illustrated in FIG. 2.

The address decoding circuitry 302 which generates instructions INSTR, ACK, DATAIN, and DATAOUT is more fully shown in FIG. 3. The instruction signal INSTR uses logic gates 354, 356 and 358 to decode the phase zero clock signal $\phi 1$, address lines A0, A1 and the input/output select signal *IOSEL. It is seen that the instruction signal INSTR is the combination of a high logic level of A0, a low logic level of the *IOSEL signal, and a high logic level of the phase zero clock $\phi 0$.

The acknowledge signal ACK is formed from the the output of the logic gate 354 which decodes the address line A0 and the *IOSEL signal. The acknowledge signal ACK is the combination of a low logic level of address A0 and the low logic level of the *IOSEL signal. The data out signal DATAOUT is decoded by the gates 360, 364 and 368 providing a logical combination of the address lines A0, A1, the *IOSEL signal, and the phase zero clock $\phi 0$. The DATAOUT signal is the coincidence of the address A0 and a low level on the *IOSEL signal, and a high level on the phase zero clock $\phi 0$. Inverter 362 and NAND gate 366 decode the DATAIN signal from the address lines A0, A1 and the *IOSEL signal. The DATAIN signal is the logical combination of address line A0 and the low level of the *IOSEL signal.

With reference now to FIG. 4, the microprocessor 400 communicates with the personal computer 10 as previously described to produce control information to peripheral control elements via a frequency shift keyed data string output through a receiver/transmitter 402. The frequency shift keyed data is output to the peripheral elements over the power line 40 by connection of the receiver/transmitter 402 to the power line through conductors 418 and 416, plug 34 and a common receptacle 36. The receiver/transmitter 402 produces the frequency shift keyed signals from a serial data output from the microprocessor 400 via pin P27 or a transmit data line TxD. By enabling the receiver/transmitter 402 with a ready to send signal RTS via pin P26, the microprocessor 400 is able to output digital data to all of the peripheral control elements over the power line. Data is received from peripheral elements over the power line 40 and that data is demodulated with the receiver portion of the receiver/transmitter 402. After decoding, the information is input to the microprocessor 400 as digital data over a receive data line RxD connected to terminal T1. The received data from the receiver/transmitter 402 is enabled by the microprocessor 400 via the ready to receive signal *RTR.

The microprocessor 400 further controls a normally open solid state relay 424 which has its contacts disposed between a break in the hot conductor 412 of the power cord 32. The hot conductor 412 extends to the personal computer power cord 34. The neutral conductor 410 of the power line 40 is further extended from the plug 34 to the personal computer power cord 34. The control terminal of the solid state relay 424 is connected to the collector of an NPN power transistor 424 whose emitter is grounded. The base of transistor 424 is pulled up by resistor 420 whose other terminal is connected to a source of positive voltage +V. The base of the power transistor 422 is additionally connected to an output pin P24 of port 2 of the microprocessor 400.

Normally, the transistor 422 is conducting and saturated thereby closing the relay 424 to provide a closed circuit and power to the personal computer. The microprocessor 400 by setting pin P24 to a low logic level will sink current from the base of the transistor 422 to turn the transistor 422 off and open the contacts of the relay 424. This action will produce a power down condition for the personal computer 10 by breaking the circuit through the hot conductor 412.

Conversely, a power up condition is provided by setting pin P24 high. This action will cause the transistor 422 to saturate and thereby close the relay contacts and supply power to the personal computer 10.

The microprocessor 400 further is connected to a pair of monostable devices 426 and 428 having timing circuitry 436 and 438, respectively. An output port 1 pin P16 is connected to the trigger input T of the device 426 to provide a strob which resets the device. As long as the device 426 remains in a reset mode, a low logic level from its Q output is transmitted via a differentiator circuit, comprising resistor 430 and capacitor 432, to the *T input of the device 428. This low level signal maintains the device 428 in a set condition with its Q output low. The Q output of the device 428 is connected to the reset input RST of the microprocessor 400. When the strobes to monostable 426 occur at a frequency greater than the period of its unstable state the monostable 428 will remain reset. However, if the strobes from the output pin P16 exceed the time constant of the monostable 426 then it will reset producing a pulse to the monostable 428 and thus a pulse from the *Q output of that device. The pulse output from monostable 428 is filet-ered by capacitor 434 before being input to the RST terminal of the microprocessor 400. A pulse from the *Q output of the device 428 will cause a reset of the microprocessor 400 and a branch of the instruction execution to the initialization routine of the program contained therein.

Figure 5:
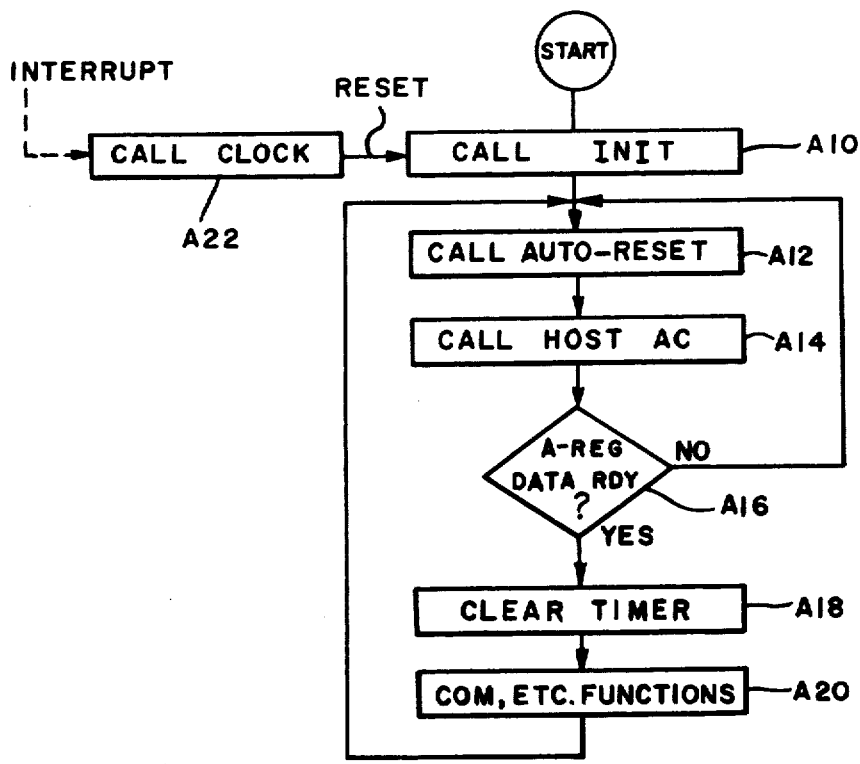
FIG. 5 is a system block flow chart of the program stored within the microprocessor illustrated in FIG. 4.

A system flow chart of the program executed by the microprocessor 400 will now be further explained with respect to FIG. 5. The program begins in block A10 where the initialization routine INIT is called. This routine initializes the hardware and other constants and variables for the other portions of the program. Initially, the C register is cleared to begin the program and provides an initialized register. The routine also clears the data ready flags from the A and B registers by reading both of those registers. Further, the INIT routine clears the timer for the restart control apparatus and loads a four-minute timeout default constant for the program into a particular location. Finally, the INIT routine loads five constants in random access memory which will be summed later in the execution of the main loop to provide a RAM check.

The program thereafter transfers control to block A12 where the subroutine AUTOR is called. The auto-reset subroutine AUTOR is a self-test routine which performs a series of additions from the check constants loaded by the subroutine INIT and tests that result against a constatn sum to determine if the random access memory of the microprocessor 400 is operating correctly. If upon the operation of that position of the program the correct sum is not obtained, then the random access memory is losing data. However, if the test is valid, then the routine will strobe the monostable 426 and maintain the program sequence. Therefore, if the RAM test is failed and it is determined there may be bad data in memory, then the strobe to the monostable 426 is terminated and the device will timeout. When the device 426 times out, the program will be reset and returned to the initialization routine.

Thereafter, in block A14, the program will call the sutroutine HOSTAC. This program maintains control of the power supply to the personal computer 10 and checks a timeout register to determine if more than a predetermined amount of time has passed since the last command from the personal computer 10. If the timeout is reached before a command is given, then the HOSTAC routine will turn power off to the host personal computer. After a delay, the subroutine will turn the power back on to produce a power up cycle which causes the auto-boot to reload the application program from the disk drive 15.

Thereafter, the program continues to block A16 where the A register data ready flag is tested. If there is no data in the A register, then the program transfers control back to block A12 and continues the loop until the A register data ready flag is set. Thus, if there is no access of the A register from the personal computer 10 such that the data ready flag is not set within the timeout period of the subroutine HOSTAC, then the host computer 10 will be reset and reloaded with the application program. The access of the A register is the indication to the microprocessor 400 that the host computer is executing correctly and is termed the operational signal. However, if the A register data ready flag occurs within the timeout period, the affirmative branch from block A16 will produce a call to the subroutine TMRCLR which clears the reset timer in block A18. This subroutine restarts the timer of the power supply control and allows the system to operate in a normal loop. Thereafter, in block A20, any number of different functions can be performed by the microprocessor 400. After performing control, communication, or other functions assigned by the host computer 10, the program will loop back to block A12 and recall the auto-reset subroutine and HOSTAC subroutine in blocks A12 and A14, respectively.

FIG. 6 is a detailed flow chart of the subroutine HOSTAC which provides a logical sequence to decide whether the host computer power supply should remain on or should be turned off. In block A24, initially, the host power supply is positively maintained in an on condition by outputting a high logic level from pin P24 of the microprocessor 400. Following this operation, the program then fetches the timer constant in block A26 to determine the amount of time since the last reset of the timer. It then reads the constant in this case, four minutes, in block A28 with which it will compare the actual time of the timer. The test is accomplished in block A30 and if no timeout has occurred, the program returns immediately.

However, if the host computer has not accessed the interface board 18 and therefore the A register for more than four minutes, the affirmative branch of the program will provide a path to block A32 where the power supply to the host is cut off. The host power supply is turned off by providing a low logic level on pin P24 thereby turning off transistor 422 and opening the contacts of the relay 424. The next step in the routine clears the timer in block A34.

After the power has been turned off, the subroutine calls the auto-reset subroutine in block A36 before again fetching the timer in block A38. A test is accomplished in block A40 to determine whether the present timer value is greater than or equal to ten seconds. If the response to this test is negative, a loop is set up between blocks A36 and A38 to provide calling the auto-reset subroutine while the microprocessor 400 is waiting for the ten second delay to finish. After the delay finishes, an affirmative result of the test in A40 will transfer control to block A42 where the timer is again cleared. Thus, the HOSTAC program provides a power down condition upon sensing that the A register has not been accessed for a time period in excess of the reset time constant and thereafter delays ten seconds before providing a power up signal.

FIG. 7 is detailed flow chart of the AUTO-RESET subroutine and begins at block A44. In that step, the accumulator is loaded with a constant 1 which is stored in random access memory from the initialization routine. In blocks A46-A52, constant 1, constant 2, constant 3, constant 4 and constant 5 each stored in different random access memory locations, are summed in the accumulator. A number representing the sum of these five constants is then fetched from the random access memory in block A54. The microprocessor 400 then determines if the addition just performed is correct by matching the result of the sum with the constant. If there is no match, then the program begins an infinite loop through block A56. This infinite loop will cause the monostable device 426 to timeout and produce a reset pulse to the microprocessor 400. However, if there is a match and it appears that all constants in random access memory are being stored correctly, then in block A58 the microprocessor produces a strobe to pin P16 to keep the monostable 426 retriggered.

The subroutine which resets the timer TIMCLR will now be more fully explained with reference to the detailed flow chart in FIG. 8. Blocks A60, A62 and A63 provide the function of clearing the three restart timer locations in random access memory. Block A60 clears the minutes location of the restart timer, block A62 clears the seconds location of the restart timer and block A63 clears the subsecond portion of the restart timer.

While a preferred embodiment of the invention has been illustrated, it will be obvious to those skilled in the art that various modifications and changes may be made thereto without departing from the spirit and scope of the invention as defined in the appended claims.

APPENDIX A

```
                    668   INIT:
                    669          ; THIS ROUTINE USED
                    670          ; TO SET UP LOC 02,
                    671          ; WHICH FLAGS CHANGES
                    672          ; TO THE APPLE. ALSO,
                    673          ; THIS ROUTINE CLEARS
                    674          ; PORT 2 DATA-READY
                    675          ; FLAGS ON POWER-UP
                    676          ; BY READING BOTH
                    677          ; 00 AND 01 INPUTS.
                    678
       02C7 27      679          CLR A
       02C8 B83A    680          MOV R0,#58D
       02CA A0      681          MOV @R0,A
       02CB B832    682          MOV R0,#50D
       02CD BF07    683          MOV R7,#7D
       02CF A0      684   INIT1: MOV @R0,A
       02D0 18      685          INC R0
       02D1 EFCF    686          DJNZ R7,INIT1
```

```
02D3 8904       687             ORL P1,#00000100B
02D5 02         688             OUTL BUS,A
02D6 99FB       689             ANL P1,#11111011B
02D8 80         690             MOVX A,@R0      ; FLOAT BUS.
02D9 14D9       691             CALL PEEK
02DB 99FE       692             ANL P1,#11111110B
02DD 08         693             INS A,BUS
02DE 8901       694             ORL P1,#00000001B
                695
02E0 B828       696             MOV R0,#40D
02E2 FB         697             MOV A,R2
02E3 B905       698             MOV R1,#5D
                699     INIT2:
02E5 A0         700             MOV @R0,A
02E6 07         701             DEC A
02E7 C8         702             DEC R0
02E8 E9E5       703             DJNZ R1,INIT2   ; AUTO-RESET CHECK FILE.
                704
02EA 14F1       705             CALL TMRCLR     ; HOST POWER CONTROL TIMER.
02EC B831       706             MOV R0,#49D
02EE 2304       707             MOV A,#4D       ; 4 MINUTE TIME-OUT DEFAULT.
02F0 A0         708             MOV @R0,A
02F1 27         709             CLR A
02F2 62         710             MOV T,A
02F3 25         711             EN TCNTI
02F4 55         712             STRT T
                713
02F5 0409       714             JMP MAINLP
0000            17              ORG 000
                18
0000 44C7       19              JMP INIT
                20
0007            21              ORG 0007H
                22
0007 6400       23              JMP CLOCK
                24
                25
                26      MAINLP:
0009 74A1       27              CALL AUTOR
000B 74B8       28              CALL HOSTAC     ; POWER CONTROL FOR HOST.
000D 8903       29              ORL P1,#003H
000F 8A03       30              ORL P2,#003H
0011 0A         31              IN A,P2
0012 1209       32              JB0 MAINLP
0014 14F1       33              CALL TMRCLR     ; CLEAR POWER CONTROL TIMER.
0016 99FE       34              ANL P1,#11111110B
0018 08         35              INS A,BUS
0019 8901       36              ORL P1,#00000001B
001B AF         37              MOV R7,A        ; COMMAND WORD.
001C 9622       38              JNZ ML0
001E 14DF       39              CALL POKE       ; ACK IN RESPONSE TO NOP.
0020 0409       40              JMP MAINLP

199     TMRCLR:
00F1 27         200             CLR A
00F2 B829       201             MOV R0,#41D
00F4 A0         202             MOV @R0,A
```

```
00F5 18        203             INC R0
00F6 A0        204             MOV @R0,A       ; CLEAR HOST RE-START TIMER.
00F7 18        205             INC R0
00F8 A0        206             MOV @R0,A
00F9 93        207             RETR

849     AUTOR:
03A1 27        850             CLR A
03A2 B824      851             MOV R0,#36D
03A4 60        852             ADD A,@R0
03A5 18        853             INC R0
03A6 60        854             ADD A,@R0
03A7 18        855             INC R0
03A8 60        856             ADD A,@R0
03A9 18        857             INC R0
03AA 60        858             ADD A,@R0
03AB 18        859             INC R0
03AC 60        860             ADD A,@R0
03AD D3BE      861             XRL A,#19OD
03AF 96AF      862     AUTOR1: JNZ AUTOR1
03B1 8A40      863             ORL P2,#01000000B
03B3 9ABF      864             ANL P2,#10111111B   ; STROBE TO PIN 37.
03B5 8A40      865             ORL P2,#01000000B
03B7 93        866             RETR
               868     HOSTAC:                     ; POWER CONTROL TO HOST.
03B8 8A20      869             ORL P2,#00100000B   ; HOST POWER ON.
03BA B82B      870             MOV R0,#43D
03BC F0        871             MOV A,@R0
03BD A8        872             MOV R0,A
03BE B931      873             MOV R1,#49D
03C0 F1        874             MOV A,@R1           ; FETCH TIME-OUT.
03C1 D8        875             XRL A,R0
03C2 C6C5      876             JZ HOST1
03C4 93        877             RETR
               878     HOST1:                      ; TIME-OUT REACHED
               879                                 ; BETWEEN COMMANDS FROM HOST.
03C5 9ADF      880             ANL P2,#11011111B   ; TURN OFF POWER TO HOST.
03C7 14F1      881             CALL TMRCLR
               882     HOST2:
03C9 74A1      883             CALL AUTOR
03CB B82A      884             MOV R0,#42D
03CD F0        885             MOV A,@R0
03CE D30A      886             XRL A,#10D          ; TEN SECONDS.
03D0 96C9      887             JNZ HOST2
03D2 14F1      888             CALL TMRCLR
03D4 93        889             RETR
```

What is claimed is:

1. An automatic loading apparatus for a processor system which is operably connected to a first power supply and includes an auto-boot; wherein the auto-boot automatically loads a random access memory defining a portion of a memory space of the processor system with an application program from a non-volatile memory upon a power up condition, and wherein the application program executes at least one set of instructions periodically when running correctly, said automatic loading appartus comprising:

means, having a memory location mapped in the memory space of the processor system, for generating an operational signal by accessing said memory location when said at least one set of instructions is executed wherein said means for generating said operational signal is coupled to a bus of said processor system and includes means for determining when the memory address assigned to said means for generating said operational signal is accessed by the processor system;

a second power supply;

a programmable controller, connected to said second power supply and connected to said processor system by said bus, for detecting said operational signal and for generating a plurality of control signals; and means for switching off and for switching on the first power supply in response to said plurality on control signals, said programmable controller generating one of said control signals to said means for switching thereby turning the first power supply on in response to detecting said operational signal within the time period of correct execution of the at least one set of instructions, and said programmable controller generating another one of said control signals to said means for switching thereby turning the first power supply off and then on again in response to not detecting the operational signal within the time period of correct execution of the at least one set of instructions, the operation of turning off the first power supply and the turning it on again creating the power up condition for said processor system and a consequent loading and reinitialization of the random access memory with the application program by the auto-boot.

2. An automatic loading apparatus as defined in claim 1 wherein said means for determining includes: address decoding circuitry.

3. An automatic loading apparatus as defined in claim 2 wherein said programmable controller comprises a microprocessor based control system including:

a microprocessor for receiving said operational signal and comparing the frequency of the access to a predetermined period of time and for controlling the connection of the processor system to the first power supply in accordance with that frequency;

said means for switching including a relay having its switch contacts disposed between at least one power conductor of the first power supply and having its control terminal connected to an output port of said microprocessor;

said microprocessor generating said control signals for controlling said relay to open said contacts if the frequency of the operational signal is less than said predetermined period causing a power down condition and then generating said control signal controlling said relay to close said contacts causing a power up condition; and controlling said relay to maintain said contacts closed if the frequency of the operational signal is greater than or equal to said predetermined period.

4. An automatic loading apparatus as defined in claim 3 wherein:

said microprocessor strobes a timing circuit periodically.

5. An automatic loading apparatus as defined in claim 4 wherein said timing circuit comprises:

a retriggerable device which generates an output signal of one level if said microprocessor strobes occur at a frequency greater than a second predetermined period and generates a reset pulse to said microprocessor if the frequency is less than said second predetermined period.

6. An automatic loading apparatus as defined in claim 1 wherein said means for switching includes:

means for delaying the power up condition of the processor system for a predetermined period of time after a power down condition.

* * * * *

UNITED STATES PATENT AND TRADEMARK OFFICE
CERTIFICATE OF CORRECTION

PATENT NO. : 4,654,821

DATED : March 31, 1987

INVENTOR(S) : Theodore R. Lapp

It is certified that error appears in the above-identified patent and that said Letters Patent is hereby corrected as shown below:

Face              Assignee: - Change "Q-COM, Inc,," to --Q-COM, Inc.--

Column 2, Line 41, Change "where upon" to --whereupon--.

Column 4, Line 62, Change "appendix" to --APPENDIX--.

Column 8, Line 51, Delete "the" (second occurrence).

Column 9, Line 54, Change "strob" to --strobe--.

Column 10, Line 28, Change "constatn" to --constant--.

Column 10, Line 30, Change "position" to --portion--.

Column 10, Line 41, Change"sutroutine" to --subroutine--.

Column 12, Line 8, After "is" insert --a--.

Column 15, Line 63 (Claim 1), Change "non-volatile" to --nonvolatile--.

Signed and Sealed this

Twenty-fifth Day of August, 1987

Attest:

DONALD J. QUIGG

Attesting Officer        Commissioner of Patents and Trademarks